(12) United States Patent
Calkins et al.

(10) Patent No.: US 9,452,533 B2
(45) Date of Patent: Sep. 27, 2016

(54) ROBOT MODELING AND POSITIONING

(71) Applicant: New River Kinematics, Inc., Williamsburg, VA (US)

(72) Inventors: Joseph M. Calkins, Williamsburg, VA (US); Robert J. Salerno, Williamsburg, VA (US)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 268 days.

(21) Appl. No.: 13/895,339

(22) Filed: May 15, 2013

(65) Prior Publication Data

US 2014/0343727 A1 Nov. 20, 2014

(51) Int. Cl.
*B25J 9/16* (2006.01)

(52) U.S. Cl.
CPC .... *B25J 9/1692* (2013.01); *G05B 2219/39019* (2013.01); *G05B 2219/39031* (2013.01)

(58) Field of Classification Search
CPC .......... G05B 2219/39019; G05B 2219/39031; G05B 2219/45083; G05B 2219/40527; B25J 9/1692; B25J 9/1605; B25J 13/089
See application file for complete search history.

(56) References Cited

U.S. PATENT DOCUMENTS

| | | | | |
|---|---|---|---|---|
| 4,662,752 A | * | 5/1987 | Tucker | B25J 9/1692 356/614 |
| 4,698,572 A | | 10/1987 | Stone | |
| 4,763,276 A | * | 8/1988 | Perreirra et al. | 700/262 |
| 4,772,831 A | * | 9/1988 | Casler et al. | 318/568.15 |
| 5,177,563 A | * | 1/1993 | Everett et al. | 356/621 |
| 2006/0129311 A1 | * | 6/2006 | Bauman et al. | 701/201 |
| 2009/0118864 A1 | * | 5/2009 | Eldridge et al. | 700/259 |
| 2009/0281661 A1 | * | 11/2009 | Dooley et al. | 700/258 |
| 2010/0262288 A1 | * | 10/2010 | Svensson et al. | 700/254 |
| 2011/0066393 A1 | * | 3/2011 | Groll et al. | 702/94 |

OTHER PUBLICATIONS

Arif Kazi et al, Next Generation Teach Pendants for Industrial Robots, Advances in Human-Robot Interaction, 2004, pp. 47-66.*
International Search Report and Written Opinion mailed Oct. 13, 2014 in PCT Application No. PCT/US2014/038262.

(Continued)

*Primary Examiner* — Abby Lin
(74) *Attorney, Agent, or Firm* — Maschoff Brennan

(57) ABSTRACT

In an example embodiment, a robot positioning device includes a first interface configured to communicate with a robot and a second interface configured to communicate with a location measuring system. The robot positioning device includes a calibrator, a modeler, and an instructor. The calibrator is configured to direct the location measuring system to determine robot calibration locations when robot joints are positioned in calibration joint positions. The modeler is configured to create a calibrated model relating robot joint positions to robot locations based at least in part on the robot calibration locations received from the location measuring system and associated calibration joint positions of the robot joints. The instructor is configured to receive a goal location from the robot. The instructor is further configured to transmit goal joint positions to the robot, the goal joint positions based at least in part on the goal location and the calibrated model.

20 Claims, 3 Drawing Sheets

(56) References Cited

OTHER PUBLICATIONS

Kang et al., "Autonomous Kinematic Calibration of the Robot Manipulator with a Linear Laser-Vision Sensor", Aug. 21, 2007, Advanced Intelligent Computing Theories and Applications With Aspects of Artificial Intelligence; [Lecture Notes in Computer Science; LNCS], Springer Berlin Heidelbérg, Berlin, Heidelberg, pp. 1102-1109, XP019129668, ISBN : 978-3-540-7 420I-2, p. 1103-p. 1106.

Santolaria et al., "Kinematic parameter estimation technique for calibration and repeatabiljty improvement of articulated arm coordinate measuring machines", Precision Engineering, Elsevier, Amsterdam, NL, vol. 32, No. 4, Oct. 1, 2008, pp. 251-268, XP023612277, ISSN: 0141-6359, DOI: 10.1016/J. Precisioneng. 2007. 09. 002 [retrieved on Oct. 13, 2007] p. 254, njght-hand column, line 7—p. 26I, right-handed column, line 20.

* cited by examiner

ROBOT MODELING AND POSITIONING

BACKGROUND

1. Field

The embodiments discussed herein relate to robot positioning devices, systems, and methods.

2. Relevant Technology

Conventional robots may follow instructions to move an instrument of the robot to a goal location, or a series of goal locations in the process of performing a task.

In many instances, robots are installed in a particular operating environment to perform a task and the joint positions necessary to perform the task are taught to the robot manually. To perform the task, the robot then moves through the learned joint positions. In such instances, calibrating the robot may not be necessary, as each goal location of the robot and/or the robot's instruments may be set manually and may simply be correlated with a set of joint positions measured by the robot.

The movement of the robot may be programed, often using computer aided design (CAD) and/or computer aided manufacture (CAM), to perform tasks without manually teaching the robot each goal location. Programing the robot using CAD/CAM and the like may be generally described herein as programing offline.

To perform movements programed offline, the robot may execute the movement based on a kinematic model of the robot. As a general matter, the kinematic model may associate joint positions of the robot with locations of the robot, and more particularly, with locations of an instrument of the robot.

To move the robot to a desired location, a program may provide the robot with a goal location. Using the goal location and the current joint positions, the robot may access a native kinematic model to determine joint positions of the robot that will allow the robot to be located in the goal location. However, unless the robot has been calibrated, the kinematic model generally does not provide joint positions needed to accurately direct the robot to the goal location.

If the robot is not calibrated, the robot will often require manual fine-tuning to accurately perform movements for a task programed offline. However, if the robot is properly calibrated, the robot may accurately perform movements for the task without manual fine-tuning.

A calibration process may be performed to calibrate the kinematic model such that the model accurately represents observed behavior of the robot. In some instances, the robot may be calibrated by positioning the robot's joints in multiple calibration positions and externally measuring the location of the robot in the calibration positions. Using the joint positions and the associated location data observed during the calibration, the kinematic model may be updated to more accurately model the robot's location to the joint positions of the robot. Conventionally, few robots are calibrated.

Calibrating a robot may allow the robot to more efficiently adapt to changing tasks. For example, implementing product changes may be streamlined by updating the robots' manufacturing tasks offline. Furthermore, robots may be used to perform an ever-changing variety of tasks without significant downtime for manual programing or manually fine-tuning programs created offline.

Robot manufacturers may prevent the native kinematic model supplied internal to the robot to be changed/updated by the user. In some instances, limited parameters such as link lines and twist may be changed by the user. However, not all of the parameters may be changed. Even if all of the parameters could be changed, the kinematic model itself may not be updatable to a more advanced kinematic model.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Embodiments relate to devices, systems, and methods for positioning a robot. In particular, embodiments may relate to devices, systems, and methods for developing a calibrated kinematic model for a robot and providing positioning information to the robot based on the calibrated kinematic model.

This Summary introduces a selection of concepts in a simplified form that are further described below in the Detailed Description. This Summary is not intended to identify key features or essential characteristics of the claimed subject matter, nor is it intended to be used as an aid in determining the scope of the claimed subject matter.

In an example embodiment, a robot positioning device for determining and providing joint positions to robots in an operation environment of the robots such that the robots will be positioned at a goal location when joints of the robots are positioned in the provided joint positions includes a first interface and a second interface. The first interface is configured to communicate with a first robot. The second interface configured to communicate with a location measuring system. The robot positioning device further includes a calibrator, a modeler, and an instructor. The calibrator is configured to direct the location measuring system via the second interface to determine multiple calibration locations of the first robot when joints of the first robot are positioned in multiple calibration joint positions. The modeler is configured to create a first calibrated model relating joint positions of the first robot to locations of the first robot. The first calibrated model is based at least in part on the multiple calibration location measurements of the first robot received from the location measuring system and associated calibration joint positions of the joints of the first robot. The instructor is configured to receive a first goal location from the first robot via the first interface. The instructor is further configured to transmit multiple goal joint positions to the first robot via the first interface, the multiple goal joint positions based at least in part on the first goal location and the first calibrated model.

In another example embodiment, a system for directing a robot to accurate locations in an operation environment includes a robot positioning device. The robot positioning device includes a first interface configured to communicate with the robot, and a second interface configured to communicate with a location measuring system. The robot positioning device further includes a calibrator, a modeler, and an instructor. The calibrator is configured to direct the location measuring system via the second interface to determine multiple calibration locations of the robot when joints of the robot are positioned in multiple calibration joint positions. The modeler is configured to create a calibrated model relating the joint positions of the robot to the locations of the robot. The calibrated model is based at least in part on the multiple calibration locations of the robot received from the location measuring system and associated multiple calibration joint positions of the joints of the robot. The instructor is configured to receive a goal location from the robot via the first interface. The instructor is further configured to transmit goal joint positions to the robot via the first interface. The goal joint positions based at least in part on the goal location and the calibrated model.

Additional features and advantages will be set forth in the description which follows, and in part will be obvious from the description, or may be learned by the practice of the embodiments. The features and advantages of the embodiments will be realized and obtained by means of the instruments and combinations particularly pointed out in the claims. These and other features will become more fully apparent from the following description and claims, or may be learned by the practice of the embodiments as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DESCRIPTION OF EMBODIMENTS

Embodiments disclosed relate to devices, systems, and methods for positioning a robot. A calibrated kinematic model may be developed for a robot. The robot may be instructed to assume multiple calibration positions while the robot's location is determined. The kinematic model may be developed based on the determined locations of the robot and the associated calibration positions.

Positioning information may be provided to the robot based on the developed kinematic model. The kinematic model may be employed without altering the robot's native kinematic model. The robot may provide a goal location, which may be used with the kinematic model to determine a set of goal joint positions that will locate the robot in the goal location. The goal joint positions may be provided to the robot so the robot may alter its joint positions and move accurately to the goal location.

Reference will now be made to the figures wherein like structures will be provided with like reference designations. The drawings are diagrammatic and schematic representations of exemplary embodiments and, accordingly, are not limiting of the scope of the claimed subject matter, nor are the drawings necessarily drawn to scale.

Figure 1:
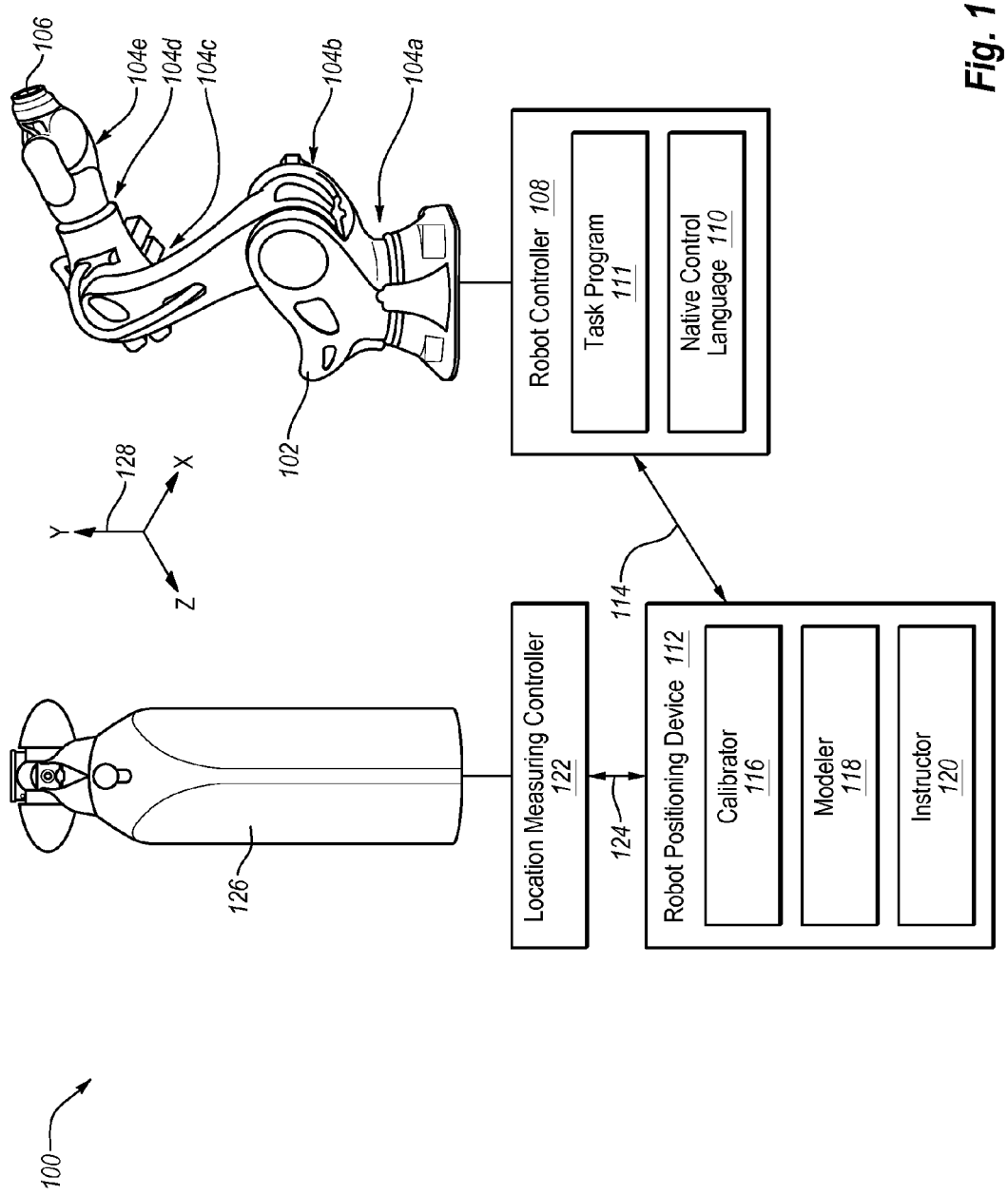
FIG. 1 is a diagrammatic view of an example robot positioning system.

FIG. 1 is a diagrammatic view of an example robot positioning system 100. The system 100 may include a robot 102.

The robot 102 may be an industrial arm-style robot 102. Alternately, embodiments may be used with other styles of robots 102. The robot 102 includes movable joints. For example, the robot 102 may include joints 104*a*, 104*b*, 104*c*, 104*d*, and 104*e* (collectively "joints 104"). Joints 104 generally describe a junction of two or more portions of the robot 102 that may be moved relative to each other. The portions may be configured to move relative to each other in a number of ways. For example, the portions may rotate relative to each other about an axis, may translate relative to each other, or the like. The word "position" is used herein to generally describe the relative placement of portions of the robot 102 relative to other portions of the robot 102. The robot 102 may generally control the positioning of the various portions of the robot 102 relative to each other.

The relative positioning of the various portions of the robot 102 may be measured and tracked by the robot 102. Values may be assigned to the relative positions and are described generally herein as joint positions. The robot 102 may generally measure the joint positions and move the joints 104 to desired joint positions with high accuracy.

The word "location" is used herein to generally describe the relative placement and orientation of portions of the robot 102 relative to the robot's environment. For example, the robot's location may be related to environmental coordinates 128. The location of the robot 102 generally includes a placement and orientation of an instrument 106 relative to the robot's environment. For example, the location may include translational displacement, as well as angular displacement of the instrument 106. The instrument 106 may include any suitable tools, including tools for painting, grasping, cutting, welding, inspecting, and the like. Often, the location of the instrument 106 is a primary concern in a program and/or task of the robot 102.

The location of the robot 102 may be related to the positions of the joints 104. For example, when the joints 104 are positioned according to a first set of joint positions, the robot 102 may be located in a first location. When the joints 104 are positioned according to a second set of joint positions, the robot 102 may be located in a second location. The robot 102 may be located in the first and second locations by respectively positioning the joints according to the first and second set of joint positions.

The robot 102 includes a native robot controller 108. The robot controller 108 generally runs via a native control language 110. Different robot 102 manufacturers may use different native control languages 110.

The robot controller 108 may include a task program 111. The task program 111 may include a script of actions that the robot 102 should take to complete a task. The task program 111 may be programed offline and provided to the robot controller 108. The task program 111 may include a series of locations that the robot 102 should move to in order to complete a task. The task program 111 may also include a series of actions the instrument 106 should take to complete the task.

The robot controller 108 may communicate with a robot positioning device 112 via a first interface 114. The interface 114 may communicate with the robot controller 108 via the native control language 110 of the robot controller 108.

The robot controller 108 may send a goal location to the device 112 and the device 112 may return a set of goal joint positions based on a calibrated kinematic model as described herein. The goal location sent to the robot controller 108 may be a location identified by the task program 111. Advantageously, the device 112 may allow the robot 102 to accurately perform tasks based on calibrated kinematic models without relying on and/or calibrating a native kinematic model located on the robot controller 108. Furthermore, the device 112 may allow more customization of the kinematic model than may be allowed for the native kinematic model located on the robot controller 108.

In some embodiments, the device 112 may be an external device 112 located in the environment of the robot 102. The interface 114 may include a physical data connection such as an Ethernet connection, universal serial bus (USB) connection, or the like. Alternately or additionally, the interface 114 may include a radio connection such as an IEEE 802.11 connection, a Bluetooth connection, or the like. In some embodiments, the device 112 may be remotely located and the interface 114 may include a remote connection such as an internet connection, intranet connection, or the like.

The device 112 includes a second interface 124 allowing the device 112 to communicate with a location measuring system including a location measuring controller 122 and a location measuring device 126. In some embodiments, the location measuring device 126 includes a laser tracker.

The device 112 may direct the location measuring controller 122 to determine the location of the robot 102. The location measuring controller 122 may direct the location measuring device 126 to measure the location of the robot 102. The location measuring device 126 may measure the location of the robot 102 via any suitable measurement technique. In some embodiments, the location measuring device 126 may measure the location of the robot 102 optically via laser tracking. Determining the location of the robot 102 may generally include determining the location of the instrument 106. In some embodiments, the location measuring device 126 measures three degrees of freedom of the instrument 106, e.g., translational displacement in x, y, and z coordinates. Alternately, the location measuring device 126 may measure six degrees of freedom of the tool 106, e.g., translational displacement in x, y, and z coordinates and angular displacement in Rx, Ry, and Rz coordinates.

The device 112 may include a calibrator 116. The calibrator 116 may facilitate a process of observing the locations of the robot 102 with a variety of joint positions such that a calibrated kinematic model may be created by a modeler 118. Calibration may include intrinsic calibration. For example, the robot 102 may be calibrated relative to a base of the robot 102. Alternately or additionally, calibration may include extrinsic calibration. For example, the robot 102 may be calibrated relative to an operating environment of the robot 102. Calibration may be performed when the device 112 is first connected to the robot 102, or when requested by a user, the device 112, the location measuring controller 122 and/or the robot 102 via the robot controller 108.

In some embodiments, the calibrator 116 may direct the robot controller 108 to instruct the robot 102 to position the joints 104 in a variety of calibration joint positions. The robot controller 108 may provide the calibration joint positions to the device 112. In some instances, calibration joint positions native to the robot 102 and/or the robot controller 108 may be used. Alternately or additionally, the device 112 may provide the robot controller 108 with calibration joint positions.

The calibrator 116 may also direct the location measuring controller 122 to instruct the location measuring device 126 to determine calibration locations of the robot 102 as it is positioned with the calibration joint positions. The calibration locations of robot 102 generally include instrument 106 calibration locations. The location measuring controller 122 provides the calibration locations to the device 112. The calibration locations may generally be associated with the calibration joint positions via time, sequence, and the like.

The modeler 118 may create a calibrated kinematic model for the robot 102 based on the calibration joint positions and the associated calibration locations observed by the location measuring system.

The instructor 120 may receive a goal location from the robot 102 via the interface 114. The goal location may be received during operation of the robot 102. The goal location may be provided by the task program 111 and may be one of a series of locations the task program 111 may provide for the robot 102 to perform a task.

The instructor 120 may determine a set of goal joint positions that will allow the robot 102 to reach the goal location based on the calibrated kinematic model created by the modeler 118. In some embodiments, the instructor 120 may also receive information describing current joint positions and/or a current location of the robot 102 via the interface 114. The current joint positions and/or the current location may be considered in determining a set of goal joint positions that will allow the robot 102 to reach the goal location based on the calibrated kinematic model.

In some embodiments, the goal location received by the instructor 120 may include a goal instrument 106 location transformation and the current joint positions and/or a current instrument 106 location. For example, the robot controller 108 may request a set of goal joint positions that will allow the robot 102 to move the instrument 106 to a goal location relative to the current location of the instrument 106. In a simplified example, the robot controller 108 may request a set of goal joint positions that will move the instrument 106 to a location 50 millimeters (mm) above, 30 mm to the right, and 20 mm back from the current location of the instrument 106.

In some embodiments, the system 100 may be used to allow the robot 102 to accurately traverse trajectories to a goal location. For example, the trajectory may be divided into a series of intermediate locations. The system 100 may direct the robot 102 through the intermediate locations at a suitable rate in a manner generally corresponding to directing the robot 102 to a series of goal locations.

Figure 2:
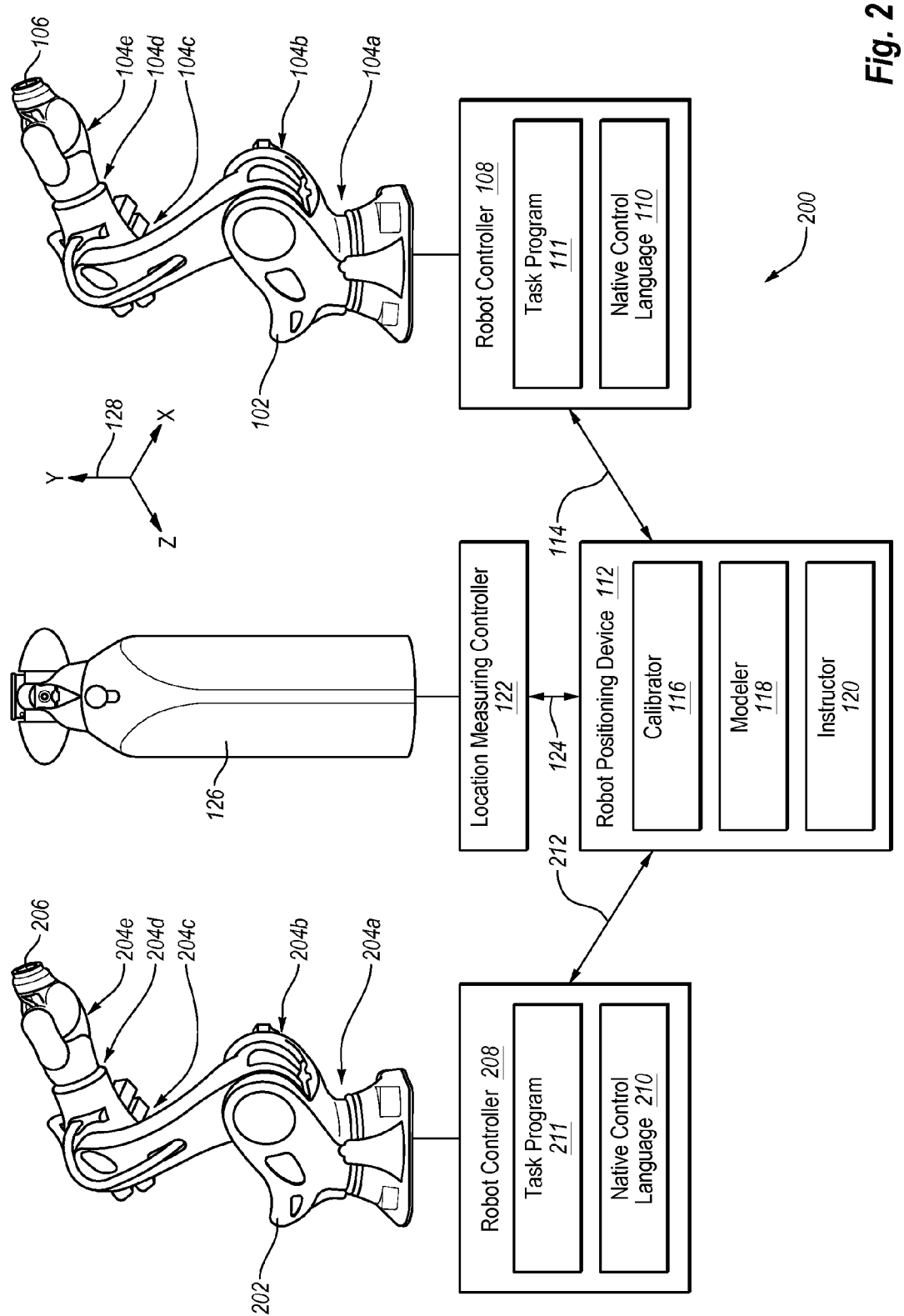
FIG. 2 is a diagrammatic view of another example robot positioning system.

In some embodiments, the device 112 may be used with multiple robots. FIG. 2 is a diagrammatic view of another example robot positioning system 200. The system 200 may include a robot 202 generally corresponding to the robot 102 described with reference to FIG. 1. The robot 202 includes movable joints. For example, the robot 202 may include joints 204a, 204b, 204c, 204d, and 204e (collectively "joints 204"). The joints 204 may generally correspond to the joints 104 described with reference to FIG. 1. The robot 202 includes a native robot controller 208 having a task program 211 and a native control language 210. The robot controller 208, the task program 211, and the native control language 210 may generally correspond to the robot controller 108, the task program 111, and the native control language 110 described with reference to FIG. 1.

The robot controller 208 may communicate with the robot positioning device 112 via a third interface 212. The interface 212 may generally correspond to the interface 114 described with reference to FIG. 1.

The device 112 may calibrate, model, and instruct the robot 202 in a manner generally corresponding to that described with reference to FIG. 1. Advantageously, during operation, the device 112 may contemporaneously provide goal joint positions to both the robot 102 and the robot 202.

In some embodiments, the location measuring device 126 may measure the locations of both the robot 102 and the robot 202 during their respective calibrations. Alternately or additionally, the system 200 may include an additional location measuring system (not shown) in communication with the device 112.

Figure 3:
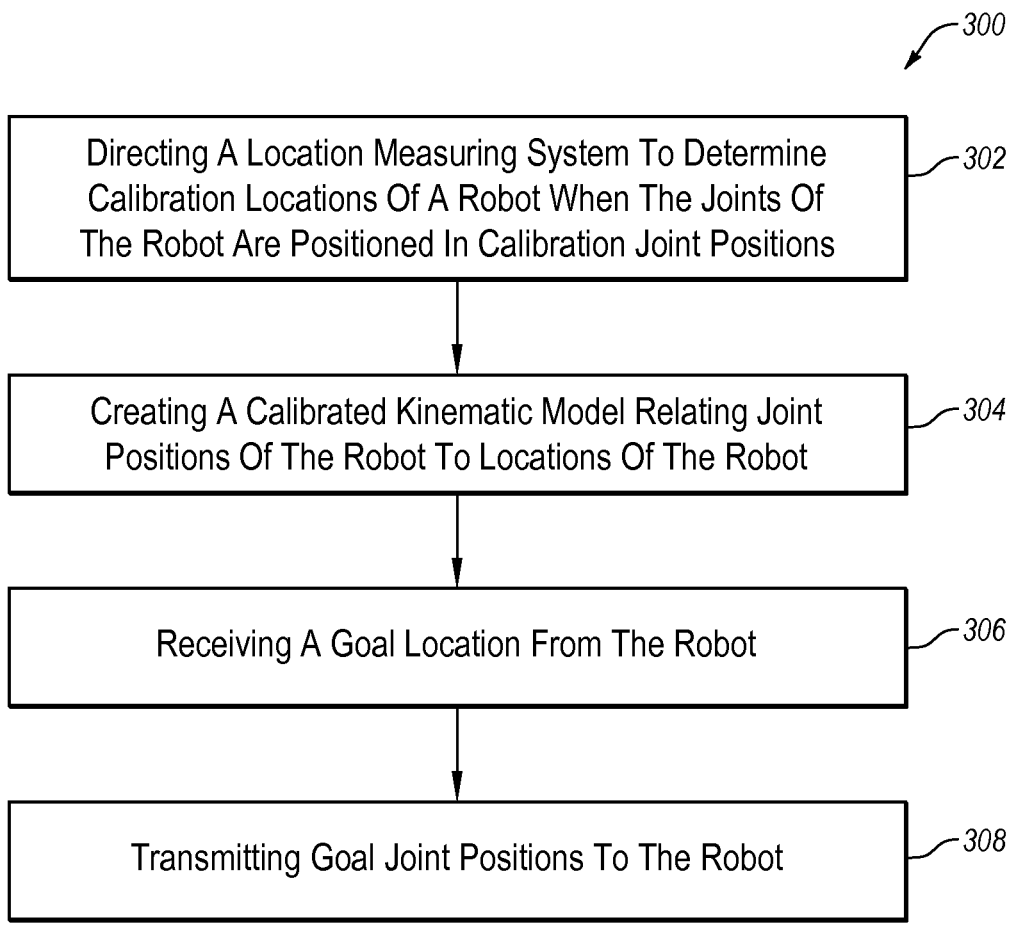
FIG. 3 is a flowchart of an example method of providing joint positions based on a calibrated kinematic model.

FIG. 3 is a flowchart of an example method 300 of providing joint positions based on a calibrated kinematic model. The method 300 may be performed, in some embodiments, in an operation environment of a robot. In some embodiments, the method 300 may be performed by a device, such as the device 112 of FIG. 1 and FIG. 2, which may be communicatively interfaced with existing robots. The method 300 may be performed by operations of a processing device executing computer instructions stored on a non-transitory computer-readable medium. In some embodiments, the processing device may generally correspond to the device 112.

The method 300 may begin at block 302 by directing a location measuring system to determine calibration locations of a robot when the joints of the robot are positioned in calibration joint positions. The location measuring system may generally correspond to the location measuring controller 122 and the location measuring device 126 of FIG. 1. The robot may generally correspond to the robot 102 of FIG. 1.

The method 300 may continue at block 304 and may include creating a calibrated kinematic model relating joint positions of the robot to locations of the robot. The calibrated kinematic model may be based at least in part on the calibration locations of the robot received from the location measuring system and associated calibration joint positions of the joints of the robot.

The method 300 may continue at block 306 and may include receiving a goal location from the robot. In some embodiments, the goal location may include a goal instrument location transformation of an instrument of the robot. The instrument may generally correspond to the instrument of FIG. 1.

The method 300 may continue at block 308 and may include transmitting goal joint positions to the robot. The goal joint positions may be based at least in part on the goal location and the calibrated kinematic model. In some embodiments, the method 300 may return to block 306 from block 308 and may repeat blocks 306 and 308 to complete a task.

Optionally, the method 300 may include receiving current joint positions and/or a current location from the robot. In some embodiments, the goal joint positions are further based at least in part on the current joint positions and/or the current location of the robot.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include tangible computer-readable storage media including random-access memory (RAM), read-only memory (ROM), electrically erasable programmable read-only memory (EEPROM), compact disc read-only memory (CD-ROM) or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions include, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A robot positioning device for determining and providing joint positions to robots in an operation environment of the robots such that the robots will be positioned at a goal location when joints of the robots are positioned in the provided joint positions, the robot positioning device comprising:
   a first interface configured to communicate with a first robot including:
      a plurality of portions movably attached together via a plurality of joints; and
      a first robot controller having a first native kinematic model associated with the first robot;
   a second interface configured to communicate with a location measuring system;
   a calibrator configured to direct the location measuring system to measure a plurality of calibration locations of the first robot relative to the operation environment of the first robot when the plurality of joints of the first robot are positioned in a plurality of calibration joint positions relative to the first robot;
   a modeler configured to create a first calibrated kinematic model relating the joint positions of the plurality of joints of the first robot to locations of one or more of the plurality of portions of the first robot, the first calibrated kinematic model based at least in part on the plurality of calibration locations of the first robot received from the location measuring system and the plurality of calibration joint positions of the plurality of joints of the first robot; and an instructor configured to:
receive a first goal location from the first robot via the first interface;
determine a first plurality of goal joint positions based at least in part on the first goal location and the first calibrated kinematic model, the first plurality of goal joint positions configured to locate the first robot at the first goal location when the plurality of joints of the first robot are positioned according to the first plurality of goal joint positions; and
transmit the first plurality of goal joint positions to the first robot via the first interface,
wherein the first robot is configured to move to the first goal location based on the first plurality of goal joint positions without relying on the first native kinematic model of the first robot controller.

2. The robot positioning device of claim 1, wherein the calibrator is further configured to:
direct the first robot via the first interface to position the plurality of joints of the first robot in the plurality of calibration joint positions, and
direct the location measuring system to determine the plurality of calibration locations of the first robot when the plurality of joints of the first robot are positioned in the plurality of calibration joint positions of the first robot.

3. The robot positioning device of claim 2, wherein the calibrator is configured to:
direct the first robot via the first interface to position the plurality of joints of the first robot in the plurality of calibration joint positions, and
direct the location measuring system to determine the plurality of calibration locations of the first robot when the plurality of joints of the first robot are positioned in the plurality of calibration joint positions of the first robot, in response to an input from a user.

4. The robot positioning device of claim 1, wherein:
the instructor is further configured to receive a plurality of current joint positions from the first robot via the first interface, and
the first plurality of goal joint positions are further based at least in part on the plurality of current joint positions.

5. The robot positioning device of claim 1, wherein the first interface is configured to communicate with the first robot via a native control language of the first robot.

6. The robot positioning device of claim 1, wherein the goal location includes a goal instrument location transformation of an instrument of the first robot.

7. The robot positioning device of claim 1, wherein the plurality of calibration locations of the first robot include a plurality of instrument calibration locations of an instrument of the first robot.

8. The robot positioning device of claim 1, wherein the first interface is a radio interface.

9. The robot positioning device of claim 1, further comprising:
a third interface configured to communicate with a second robot including a second robot controller having a second native kinematic model associated with the second robot;
the calibrator further configured to direct the location measuring system via the second interface to determine a plurality of calibration locations of the second robot relative to the operation environment of the second robot when a plurality of joints of the second robot are positioned in a second plurality of calibration joint positions relative to the second robot;
the modeler further configured to create a second calibrated kinematic model relating the joint positions of the plurality of joints of the second robot to the locations of the second robot, the second calibrated kinematic model based at least in part on the second plurality of calibration locations of the second robot received from the location measuring system and the second plurality of calibration joint positions of the plurality of joints of the second robot; and
the instructor further to:
receive a second goal location from the second robot via the third interface;
determine a second plurality of goal joint positions based at least in part on the second goal location and the second calibrated kinematic model, the second plurality of goal joint positions configured to locate the second robot at the second goal location when the plurality of joints of the second robot are positioned according to the second plurality of goal joint positions; and
transmit the second plurality of goal joint positions to the second robot via the third interface,
wherein the second robot is configured to move to the second goal location based on the second plurality of goal joint positions without relying on the second native kinematic model of the second robot controller.

10. A system for directing a robot including a robot controller having a native kinematic model associated with the robot and a plurality of portions movably attached together via a plurality of joints to accurate locations in an operation environment, the system comprising:
a robot positioning device including:
a first interface configured to communicate with the robot;
a second interface configured to communicate with a location measuring system;
a calibrator configured to direct the location measuring system to measure a plurality of calibration locations of the plurality of portions of the robot relative to the operation environment when the plurality of joints of the robot are positioned in a plurality of calibration joint positions relative to the robot, wherein the location measuring system optically measures the calibration locations of each of the plurality of portions of the robot;
a modeler configured to create a calibrated kinematic model relating the joint positions of the plurality of joints of the robot to locations of one or more of the plurality of portions of the robot, the calibrated kinematic model based at least in part on the plurality of calibration locations of the robot received from the location measuring system and the plurality of calibration joint positions of the plurality of joints of the robot; and
an instructor configured to:
receive a goal location from the robot via the first interface;
determine a plurality of goal joint positions based at least in part on the goal location and the calibrated kinematic model, the plurality of goal joint positions configured to locate the robot at the goal location when the plurality of joints of the robot are positioned according to the plurality of goal joint positions; and
transmit the plurality of goal joint positions to the robot via the first interface, wherein the robot is configured to move to the goal location based on the plurality of goal joint positions without relying on the native kinematic model of the robot controller.

11. The system of claim 10, further comprising:
the robot including:
the plurality of joints, each joint of the plurality of joints being movable through a range of joint positions, and
the robot controller having a native control language, the controller configured to:
instruct the plurality of joints to move to a plurality of calibration joint positions,
determine a plurality of current joint positions of the plurality of joints,
communicate the goal location to the robot positioning device via the first interface,
receive the plurality of goal joint positions from the robot positioning device, and
instruct each joint of the plurality of joints to move to an associated goal joint position of the plurality of goal joint positions received from the robot positioning device.

12. The system of claim 10, further comprising:
the location measuring system, including:
a location measuring controller configured to receive instructions via the second interface directing the location measuring system to determine the plurality of calibration locations of the robot when the plurality of joints of the robot are positioned in the plurality of calibration joint positions, and
a location measuring device configure to determine the plurality of calibration locations of the robot when the plurality of joints of the robot are positioned in the plurality of calibration joint positions.

13. The system of claim 12, wherein the location measuring device includes a laser tracker.

14. The system of claim 10, wherein the calibrator is further configured to direct the robot via the first interface to position the plurality of joints of the robot in the plurality of calibration joint positions.

15. The system of claim 10, wherein:
the instructor is further configured to receive a plurality of current joint positions from the robot via the first interface, and
the plurality of goal joint positions are further based at least in part on the plurality of current joint positions.

16. The system of claim 10, wherein the goal location includes a goal instrument location transformation of an instrument of the robot.

17. The system of claim 10, wherein the plurality of locations of the robot include a plurality of instrument locations of an instrument of the robot.

18. A method of providing joint positions based on a calibrated kinematic model to a robot including a plurality of portions movably attached together via a plurality of joints in an operation environment of the robot such that the robot will be positioned at a goal location when joints of the robot are positioned in the provided joint positions, the method comprising:
interfacing communicatively with a robot that includes a robot controller having a native kinematic model;
directing, with a processing device, a location measuring system to measure a plurality of calibration locations of the plurality of portions of the robot when the plurality of joints of the robot are positioned in a plurality of calibration joint positions, wherein the location measuring system optically measures the calibration locations of each of the plurality of portions of the robot;
creating the calibrated kinematic model relating the positions of the plurality of joints of the robot to locations of one or more of the plurality of portions of the robot, the calibrated kinematic model based at least in part on the plurality of calibration locations of the plurality of portions of the robot received from the location measuring system and the plurality of calibration joint positions of the plurality of joints of the robot;
receiving a goal location from the robot;
determining a plurality of goal joint positions based at least in part on the goal location and the calibrated kinematic model, the plurality of goal joint positions configured to locate the robot at the goal location when the plurality of joints of the robot are positioned according to the plurality of goal joint positions;
transmitting a plurality of goal joint positions to the robot; and
moving, by the robot controller, the robot to the goal location based on the goal joint positions without relying on the native kinematic model.

19. The method of claim 18, further comprising receiving a plurality of current joint positions from the robot, wherein the plurality of goal joint positions are further based at least in part on the plurality of current joint positions.

20. The method of claim 19, wherein the goal location includes a goal instrument location transformation of an instrument of the robot.

* * * * *